United States Patent
Kim et al.

(10) Patent No.: US 7,448,758 B2
(45) Date of Patent: Nov. 11, 2008

(54) ILLUMINATION UNIT AND PROJECTION TYPE IMAGE DISPLAY APPARATUS EMPLOYING THE SAME

(75) Inventors: Jong-hoi Kim, Suwon-si (KR); Young-chol Lee, Gunpo-si (KR); Kye-hoon Lee, Suwon-si (KR); Won-yong Lee, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 344 days.

(21) Appl. No.: 11/234,321

(22) Filed: Sep. 26, 2005

(65) Prior Publication Data

US 2006/0114420 A1 Jun. 1, 2006

(30) Foreign Application Priority Data

Nov. 27, 2004 (KR) .................. 10-2004-0098362

(51) Int. Cl.
- G03B 21/28 (2006.01)
- G03B 21/00 (2006.01)
- G02F 1/00 (2006.01)
- F21V 7/04 (2006.01)

(52) U.S. Cl. .................. 353/81; 353/33; 348/771; 362/555

(58) Field of Classification Search .................. 353/81, 353/33; 348/771; 362/555
See application file for complete search history.

(56) References Cited

U.S. PATENT DOCUMENTS

2004/0109329 A1* 6/2004 Kato .................. 362/555

2005/0018147 A1* 1/2005 Lee et al. .................. 353/98

FOREIGN PATENT DOCUMENTS

| JP | 03-188434 | 8/1991 |
|----|-----------|--------|
| JP | 2002-162596 | 6/2002 |
| JP | 2002-341439 | 11/2002 |
| KR | 2003-24043 A | 3/2003 |

* cited by examiner

Primary Examiner—Diane I. Lee
Assistant Examiner—Magda Cruz
(74) Attorney, Agent, or Firm—Stanzione & Kim, LLP

(57) ABSTRACT

An illumination unit includes first, second, third, and fourth light source units to emit first, second, third, and fourth light beams of different wavelength bands, and a hexahedral color synthesis prism to synthesize the first, second, third, and fourth light beams emitted from the first, second, third, and fourth light source units to propagate the first, second, third, and fourth light beams can propagate along the same path with respect to each other. The color synthesis prism includes first, second, third, and fourth entrance surfaces, an exit surface through which the first, second, third, and fourth beams are propagated along the same path, a first dichroic mirror to reflect the first beam incident through the first entrance surface toward the exit surface and to transmit the second, third, and fourth beams, a second dichroic mirror to reflect the second beam incident through the second entrance surface toward the exit surface and to transmit the first, third, and fourth beams, and a third dichroic mirror to reflect the fourth beam incident through the fourth entrance surface toward the exit surface and to transmit the first, second, and third beams. A projection type image display apparatus includes the illumination unit, an image-forming device to create an image corresponding to an input image signal from first, second, third, and fourth light beams propagated from the illumination unit, and a projection lens unit to enlarge and project the image created by the image-forming device onto a screen.

28 Claims, 11 Drawing Sheets

ILLUMINATION UNIT AND PROJECTION TYPE IMAGE DISPLAY APPARATUS EMPLOYING THE SAME

CROSS-REFERENCE TO RELATED APPLICATIONS

This application claims the priority under 35 U.S.C. § 119 of Korean Patent Application No. 10-2004-98362, filed on Nov. 27, 2004, in the Korean Intellectual Property Office, the disclosure of which is incorporated herein in its entirety by reference.

BACKGROUND OF THE INVENTION

1. Field of the Invention

The present general inventive concept relates to an illumination unit to emit light and a projection type image display apparatus employing the same, and more particularly, to an illumination unit with an improved prism, which synthesizes light emitted from a compact light source, and a projection type image display apparatus employing the illumination unit.

2. Description of the Related Art

In general, illumination units include a light source emitting light in one direction and an illumination optical system transmitting the light emitted from the light source. The illumination units are widely used in projection type image display apparatuses that create an image using an image-forming device (e.g., a liquid crystal display (LCD) device or a digital micromirror device (DMD)) that cannot emit light.

In recent years, illumination units and projection type image display apparatuses using a small light-emitting device, such as a light-emitting diode or a laser diode as a light source, have been developed.

Since small light-emitting devices can emit beams of red, blue, and green wavelengths, single-panel projection type color image display apparatuses employing the small light-emitting devices do not need an additional color wheel for obtaining a color image. However, to emit various color beams, a plurality of small light-emitting devices and a structure for synthesizing the various color beams are required.

Referring to FIG. 1, a conventional illumination unit includes first, second, and third LED light sources 11, 12, and 13 disposed at different positions and respectively emitting beams of red, blue, and green wavelengths, and a trichroic prism 20 propagating the beams emitted from the first, second, and third LED light sources 11, 12, and 13 along the same path.

The trichroic prism 20 includes first, second, and third prisms $P_1$, $P_2$, and $P_3$, a first color filter 21 disposed between the first prism $P_1$ and the third prism $P_3$, and a second color filter 25 disposed between the second prism $P_2$ and the third prism $P_3$. The first and second color filters 21 and 25 selectively transmit or reflect incident light according to a wavelength of the incident light. For example, the first color filter 21 reflects a first beam R of a red wavelength and transmits a second beam G of a green wavelength and a third beam B of a blue wavelength. The second color filter 25 reflects the third beam B and transmits the first and second beams R and G.

Accordingly, the first beam R incident on an exit surface 20a of the first prism $P_1$ from the first LED light source 11 is totally reflected based on the principle of critical angle total reflection to be directed toward the first color filter 21. The first beam R is reflected by the first color filter 21, and then transmitted through the exit surface 20a of the first prism $P_1$. The second beam G is sequentially transmitted through the second and first color filters 25 and 21, and propagates along the same path as the first beam R. The third beam B is totally reflected, based on the principle of critical angle total reflection, on a surface 20b of the third prism $P_3$ facing the first prism $P_1$ to be directed toward the second color filter 25, reflected by the second color filter 25, transmitted through the first and third prisms $P_1$ and $P_3$, and then propagates along the same path as the first and second beams R and G. Hence, the first, second, and third beams R, G, and B respectively emitted from the first, second, and third LED light sources 11, 12, and 13, which are disposed at different positions, are synthesized to propagate along the same path.

Meanwhile, for the purpose of totally reflecting the third beam B on the surface 20b of the third prism $P_3$, the first prism $P_1$ and the third prism $P_3$ are spaced a predetermined distance from each other to form an air gap $G_{air}$ therebetween. That is, to cause critical angle total reflection, there must exist a refractive index difference between the third prism $P_3$ and a surrounding medium, as well as an angle between the surface 20b of the third prism $P_3$ and the third beam B.

Accordingly, when the beams emitted from the plurality of light sources are synthesized using the trichroic prism 20, an optical arrangement of the trichroic prism 20 is difficult to establish.

Further, when the beams are synthesized using the trichroic prism 20, because of the optical arrangement of the trichroic prism 20, it is difficult to employ additional light sources for emitting beams other than the red, blue and green beams, for example, yellow, magenta, and cyan beams. Accordingly, an allowable color gamut is limited in the conventional illumination unit.

Hence, since a projection type image display apparatus employing the conventional illumination unit creates an image by combining the three color beams, it is difficult to use light sources to emit four or more color beams due to limitations of the conventional illumination unit.

SUMMARY OF THE INVENTION

The present general inventive concept provides an illumination unit with an improved color synthesis prism, which offers an extended color gamut, and a projection type image display apparatus employing the illumination unit.

Additional aspects of the present general inventive concept will be set forth in part in the description which follows and, in part, will be obvious from the description, or may be learned by practice of the general inventive concept.

The foregoing and/or other aspects of the present are achieved by providing an illumination unit including first, second, third, and fourth light source units to emit first, second, third, and fourth light beams having different wavelength bands, and a hexahedral color synthesis prism to synthesize the first, second, third, and fourth light beams emitted from the first, second, third, and fourth light source units to propagate the first, second, third, and fourth light beams along the same path with respect to each other. The color synthesis prism includes first and second entrance surfaces opposing each other and allowing the first and second light beams to be respectively incident therethrough, a third entrance surface disposed adjacent to the first and second entrance surfaces and allowing the third light beam to be incident therethrough, a fourth entrance surface disposed adjacent to the first, second, and third entrance surfaces and allowing the fourth light beam to be incident therethrough, an exit surface disposed adjacent to the first, second, and fourth entrance surfaces to oppose the third entrance surface and allowing the first, second, third and fourth light beams to be emitted therethrough, a first dichroic mirror to reflect the first light beam incident through the first entrance surface toward the exit surface and to transmit the second, third, and fourth light beams therethrough, a second dichroic mirror to reflect the second light beam incident through the second entrance surface toward the exit surface and to transmit the first, third, and fourth light beams therethrough, and a third dichroic mirror to reflect the fourth light beam incident through the fourth entrance surface toward the exit surface and to transmit the first, second, and third light beams therethrough.

The foregoing and/or other aspects of the present general inventive concept are also achieved by providing an illumination unit, including a hexahedral prism, first, second, third, and fourth light emitting units each disposed at a different outer face of the hexahedral prism to emit light having first, second, third, and fourth predetermined wavelengths into the hexahedral prism, and a plurality of dichroic mirrors disposed within the hexahedral prism to reflect and transmit the light emitted by the first, second, third, and fourth light emitting units according to the first, second, third, and fourth predetermined wavelengths to output the light emitted by the first, second, third, and fourth light emitting units from the hexahedral prism along a common light path.

The foregoing and/or other aspects of the present general inventive concept are also achieved by providing an illumination unit, including four or more light emitting units to emit light beams having different predetermined wavelengths, and a color synthesizing unit including a plurality of prisms arranged to form a hexahedron to receive the light beams emitted by the light emitting units therein and to reflect and transmit the light beams to output the light beams along the same path with respect to each other.

The foregoing and/or other aspects of the present general inventive concept are also achieved by providing a projection type image display apparatus including an illumination unit including first, second, third, and fourth light source units to emit first, second, third, and fourth light beams having different wavelength bands, and a hexahedral color synthesis prism to synthesize the first, second, third, and fourth light beams emitted from the first, second, third, and fourth light source units to propagate the first, second, third, and fourth light beams along the same path with respect to each other, an image-forming device to create an image corresponding to an input image signal from the first, second, third, and fourth light beams propagated from the illumination unit, a screen, and a projection lens unit to enlarge and project the image created by the image-forming device onto the screen.

The foregoing and/or other aspects of the present general inventive concept are also achieved by providing an image projection apparatus including an illumination unit including a plurality of light sources to emit light beams having a plurality of predetermined wavelengths, and a hexahedral shaped synthesizing prism to receive the light beams emitted by the plurality of light sources therein through a plurality of outer surfaces thereof and to synthesize the received light beams to output the light beams along a predetermined path, and a display device to display an image corresponding to the light beams output by the hexahedron shaped synthesizing prism along the predetermined path.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
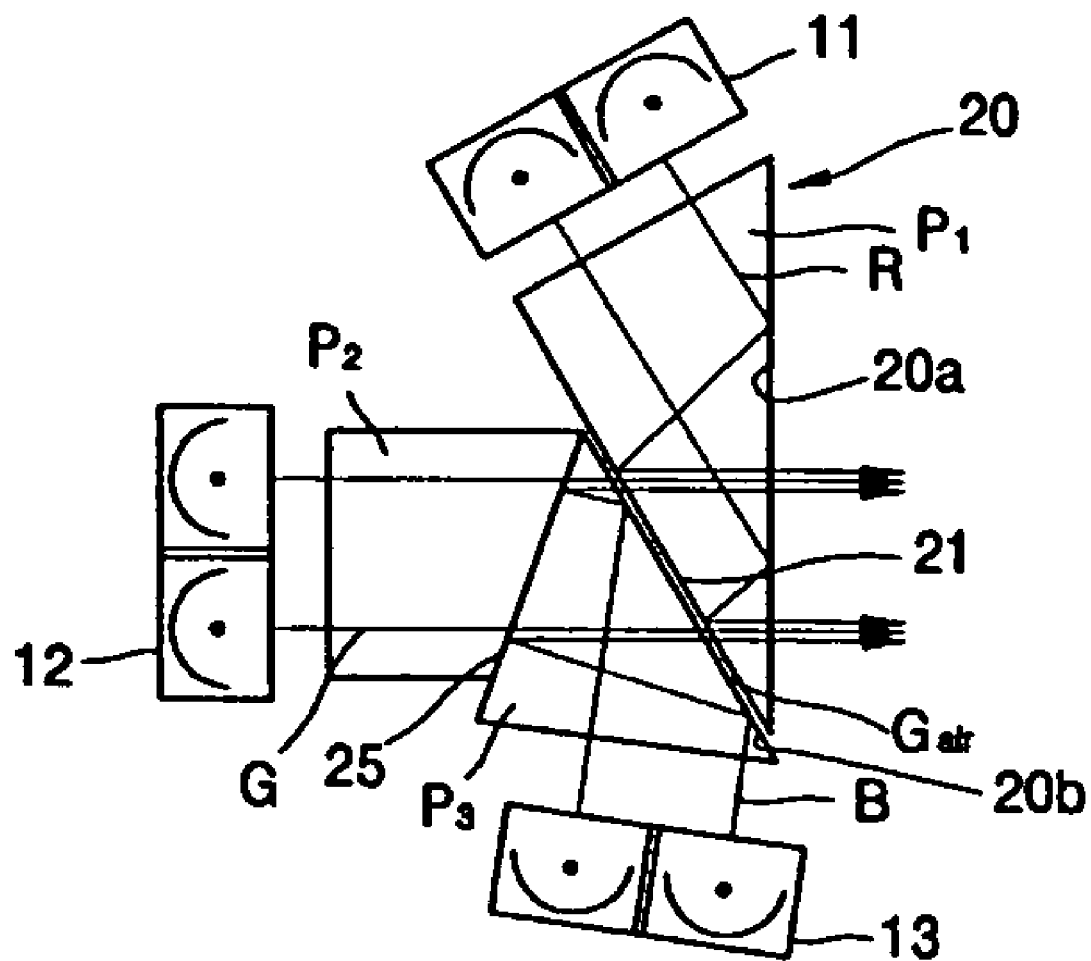
FIG. 1 is a schematic view illustrating an optical arrangement of a conventional illumination unit.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

FIGS. 2 through 5 illustrate an illumination unit according to an embodiment of the present general inventive concept. Referring to FIGS. 2 through 5, the illumination unit includes a light source unit 100 including a plurality of light source units 110, 120, 130, and 140 to emit light beams of different wavelength bands, and a color synthesis prism 200 to synthesize the light beams emitted from the light source unit 100 to propagate the light beams along the same path with respect to each other.

In the present embodiment, the light source unit 100 is divided into first, second, third, and fourth light source units 110, 120, 130, and 140 disposed at different positions and emitting light beams having different wavelengths. The first, second, third, and fourth light source units 110, 120, 130, and 140 respectively emit first, second, third, and fourth light beams $L_1$, $L_2$, $L_3$, and $L_4$ of blue, red, green, and cyan wavelength bands.

Figure 3:
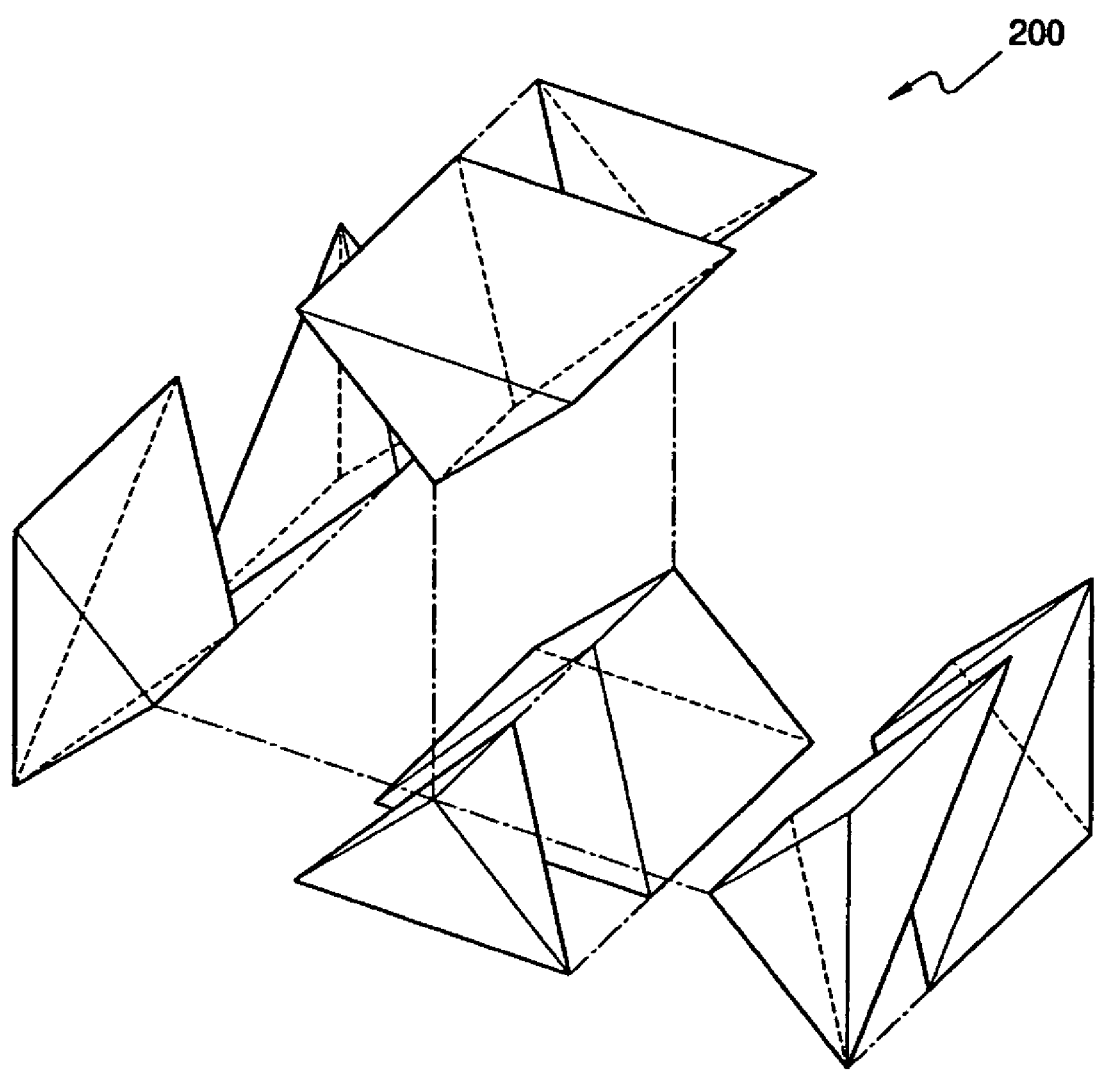
FIG. 3 is an exploded perspective view illustrating a color separation prism of the illumination unit of FIG. 2.

The color synthesis prism 200 synthesizes the first, second, third, and fourth light beams $L_1$, $L_2$, $L_3$, and $L_4$ to propagate the first, second, third, and fourth light beams $L_1$, $L_2$, $L_3$, and $L_4$ along the same path with respect to each other. The color synthesis prism 200 has a hexahedral shape, such as, for example, a regular hexahedral shape. Further, the color synthesis prism 200 is a combination of eight prisms as illustrated in FIG. 3 wherein first, second, and third dichroic mirrors 271, 273, and 275 can be installed.

Four of six surfaces that define the hexahedral color synthesis prism 200 are used as first, second, third, and fourth entrance surfaces 210, 220, 230, and 240, and one of the six surfaces is used as an exit surface 260. The first, second, and third dichroic mirrors 271, 273, and 275 are formed inside the color synthesis prism 200 to reflect or transmit the first, second, third, and fourth light beams $L_1$, $L_2$, $L_3$, and $L_4$, which are respectively emitted into the hexahedral color synthesis prism 200 through the first, second, third, and fourth entrance surfaces 210, 220, 230, and 240, such that the first, second, third, and fourth light beams $L_1$, $L_2$, $L_3$, and $L_4$ are emitted out of the hexahedral color synthesis prism 200 through the exit surface 260.

Figure 2:
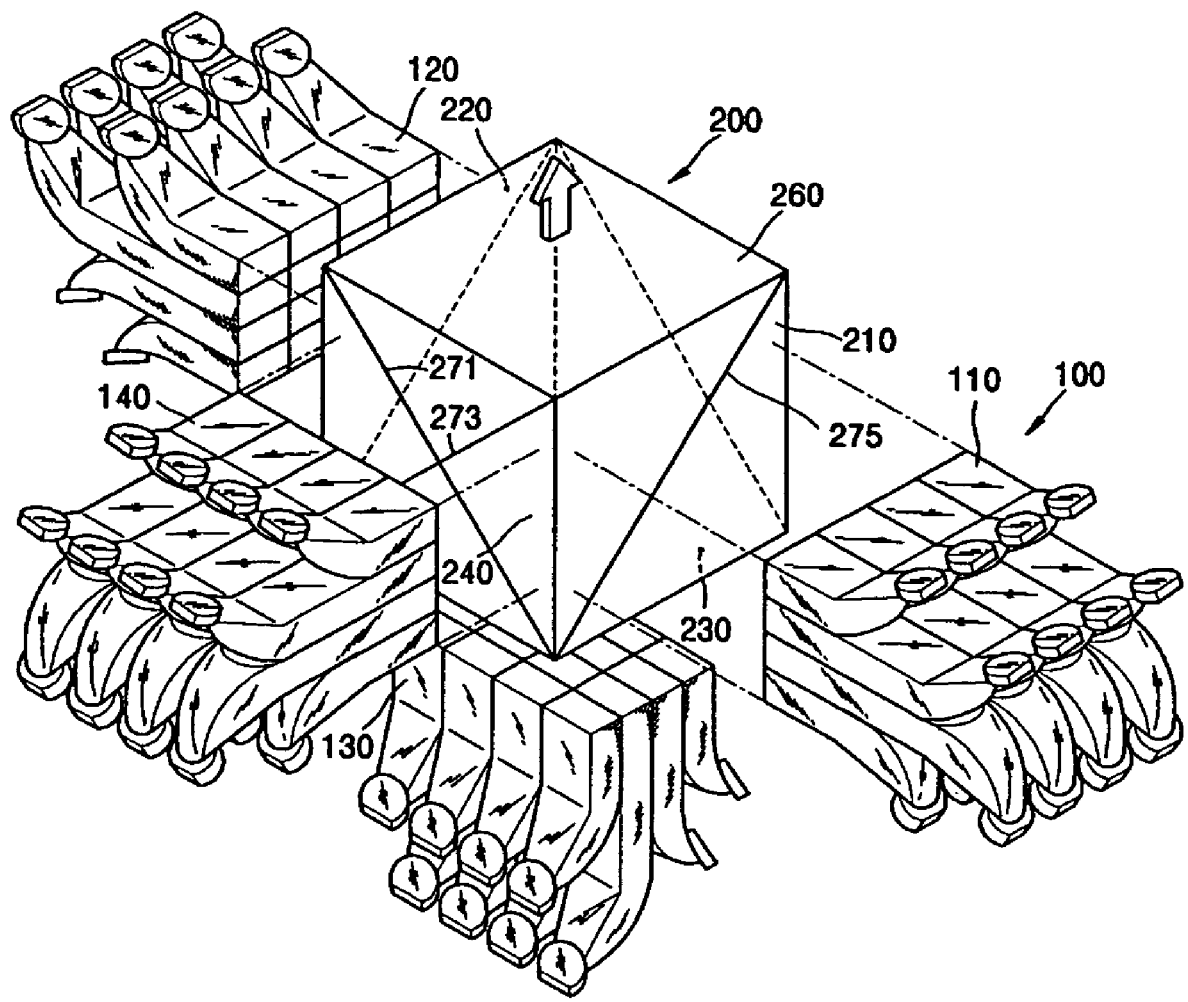
FIG. 2 is a schematic perspective view illustrating an optical arrangement of an illumination unit according to an embodiment of the present general inventive concept.
Figure 4:
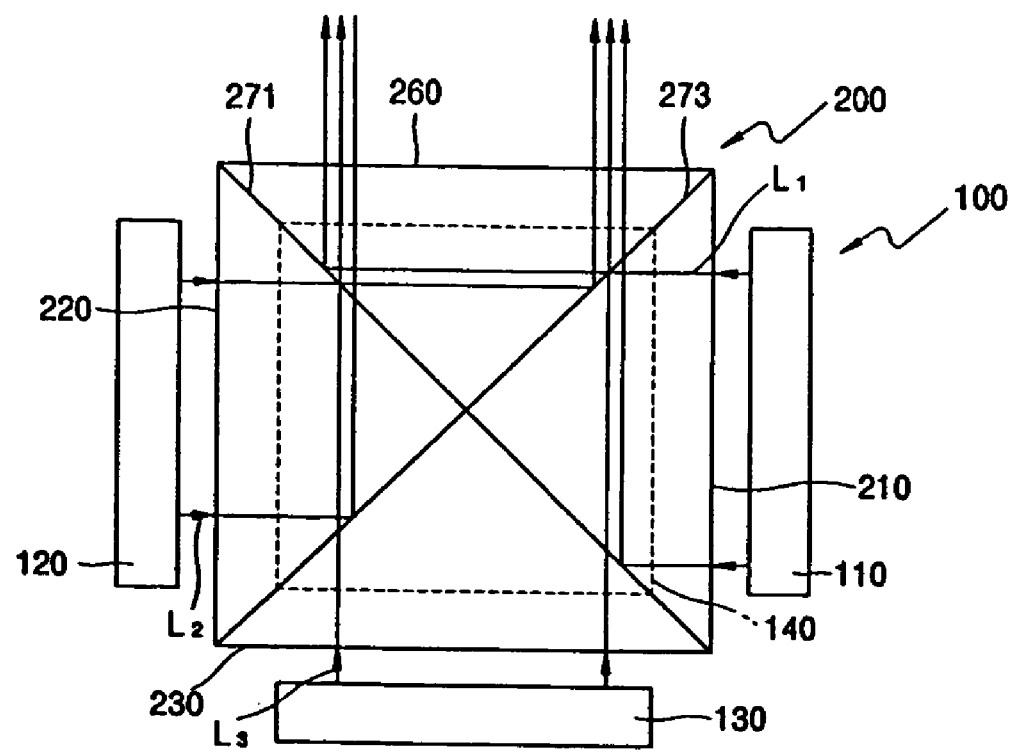
FIG. 4 is a front view illustrating the illumination unit of FIG. 2.
Figure 5:
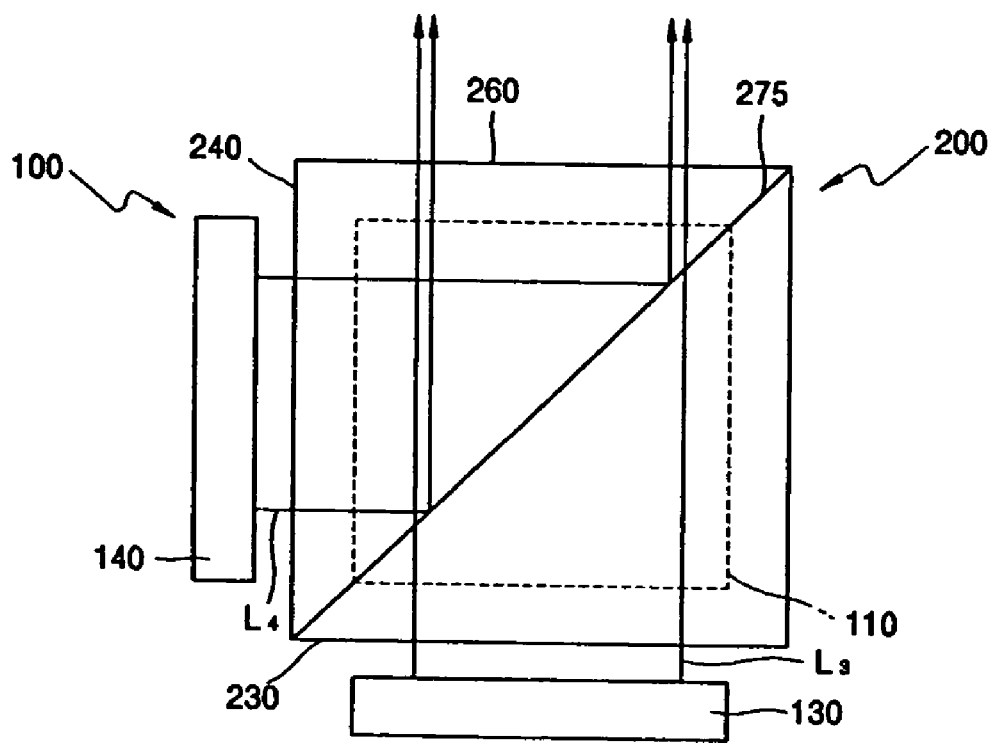
FIG. 5 is a side view illustrating the illumination unit of FIG. 2.

As illustrated in FIGS. 2, 4, and 5, the first entrance surface 210 of the color synthesis prism 200 allows the first light beam $L_1$ to be incident therethrough. The second entrance surface 220 of the color synthesis prism 200 is a surface facing the first entrance surface 210 and spaced apart from the first entrance surface 210, and allows the second light beam $L_2$ to be incident therethrough. The third entrance surface 230 of the color synthesis prism 200 is a surface adjacent to the first and second entrance surfaces 210 and 220, and allows the third light beam $L_3$ to be incident therethrough. The fourth entrance surface 240 of the color synthesis prism 200 is a surface adjacent to the first, second, and third entrance surfaces 210, 220, and 230, and allows the fourth light beam $L_4$ to be incident therethrough.

The exit surface 260 of the color synthesis prism 200 is a surface adjacent to the first, second, and fourth entrance surfaces 210, 220, and 240 and opposing the third entrance surface 230, and allows the first, second, third, and fourth beams $L_1$, $L_2$, $L_3$, and $L_4$ to be emitted therethrough.

The first dichroic mirror 271 reflects the first light beam $L_1$ incident thereon from the first entrance surface 210 toward the exit surface 260, and transmits the second, third, and fourth light beams $L_2$, $L_3$, and $L_4$ therethrough. Accordingly, the first dichroic mirror 271 has a surface to reflect the first light beam $L_1$ formed on a first diagonal section of the hexahedral color synthesis prism 200 extending in an inclined manner with respect to the first entrance surface 210 and the exit surface 260.

Figure 6:
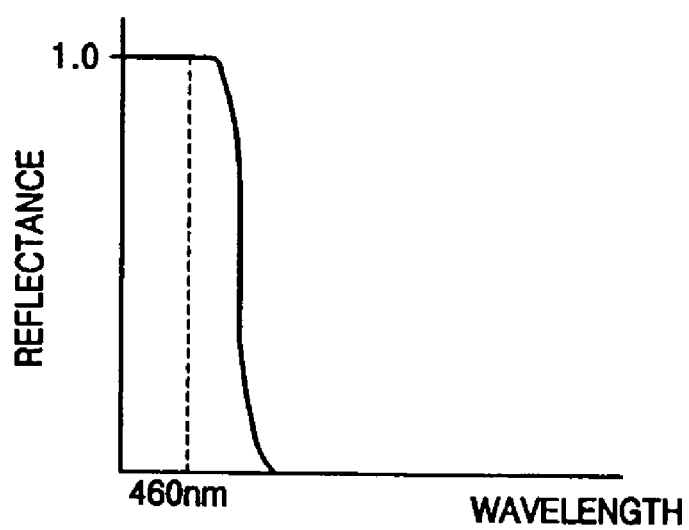
FIGS. 6 through 8 are graphs illustrating reflectance versus wavelength of first, second, and third dichroic mirrors of the illumination unit of FIG. 2, respectively.

FIG. 6 is a graph illustrating reflectance of the first dichroic mirror 271 with respect to a wavelength of a light beam incident thereon. Referring to FIG. 6, the first dichroic mirror 271 is color-coated to transmit a light beam of a wavelength longer than a first predetermined wavelength between a blue wavelength and a cyan wavelength and reflect a light beam of a wavelength shorter than the first predetermined wavelength. Accordingly, the first dichroic mirror 271 reflects the first light beam $L_1$ of the blue wavelength of about 460 nm, and transmits the second, third, and fourth beams $L_2$, $L_3$, and $L_4$ of the red, green, and cyan wavelengths longer than the blue wavelength.

The second dichroic mirror 273 is color-coated to reflect the second beam $L_2$ incident thereon through the second entrance surface 220 toward the exit surface 260 and transmit the first, third, and fourth beams $L_1$, $L_3$, and $L_4$ therethrough. Accordingly, the second dichroic mirror 273 has a surface to reflect the second beam $L_2$ formed on a second diagonal section of the hexahedral color synthesis prism 200 extending in an inclined manner with respect to the second entrance surface 220 and the exit surface 260.

Figure 7:
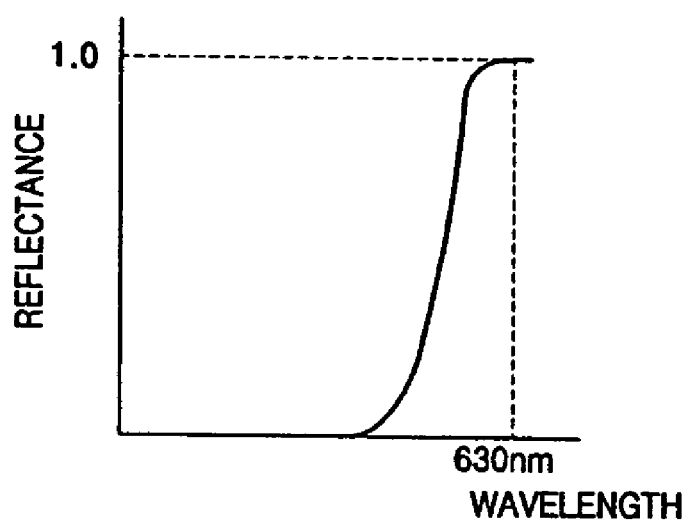

FIG. 7 is a graph illustrating reflectance of the second dichroic mirror 273 with respect to a wavelength of a light beam incident thereon. Referring to FIG. 7, the second dichroic mirror 273 reflects a light beam of a wavelength longer than a second predetermined wavelength between a green wavelength and a red wavelength and transmits a light beam of a wavelength shorter than the second predetermined wavelength. Accordingly, the second dichroic mirror 273 reflects the second light beam $L_2$ of the red wavelength of about 630 nm, and transmits the first, third, and fourth beams $L_1$, $L_3$, and $L_4$ of the blue, green, and cyan wavelengths shorter than the red wavelength.

The third dichroic mirror 275 is color-coated to reflect the fourth beam $L_4$ incident thereon through the fourth entrance surface 240 toward the exit surface 260 and transmit the first, second, and third beams $L_1$, $L_2$, and $L_3$ therethrough. Accordingly, the third dichroic mirror 275 has a surface to reflect the fourth beam $L_4$ formed on a third diagonal section of the hexahedral color synthesis prism 200 extending in an inclined manner with respect to the fourth entrance surface 240 and the exit surface 260.

Figure 8:
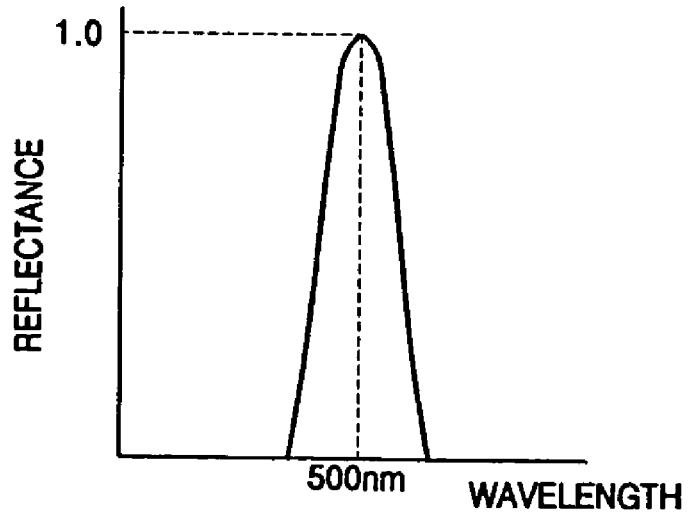

FIG. 8 is a graph illustrating reflectance of the third dichroic mirror 275 with respect to a wavelength of a light beam incident thereon. Referring to FIG. 8, the third dichroic mirror 275 reflects a light beam of a third predetermined wavelength between a blue wavelength and a green wavelength and transmits a light beam shorter or longer than the third predetermined wavelength. That is, the third dichroic mirror 275 reflects the fourth light beam $L_4$ of the cyan wavelength of about 500 nm and transmits the first, second, and third beams $L_1$, $L_2$, and $L_3$ of the blue, red, and green wavelengths other than the cyan wavelength.

Figure 9:
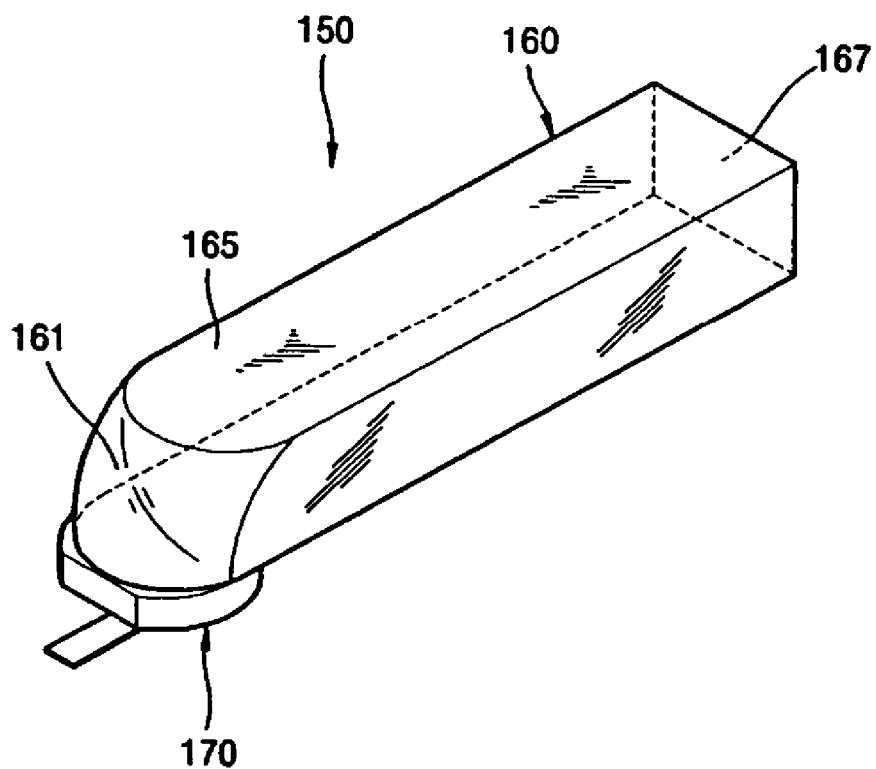
FIG. 9 is a perspective view illustrating a light source unit of the illumination unit of FIG. 2.
Figure 10:
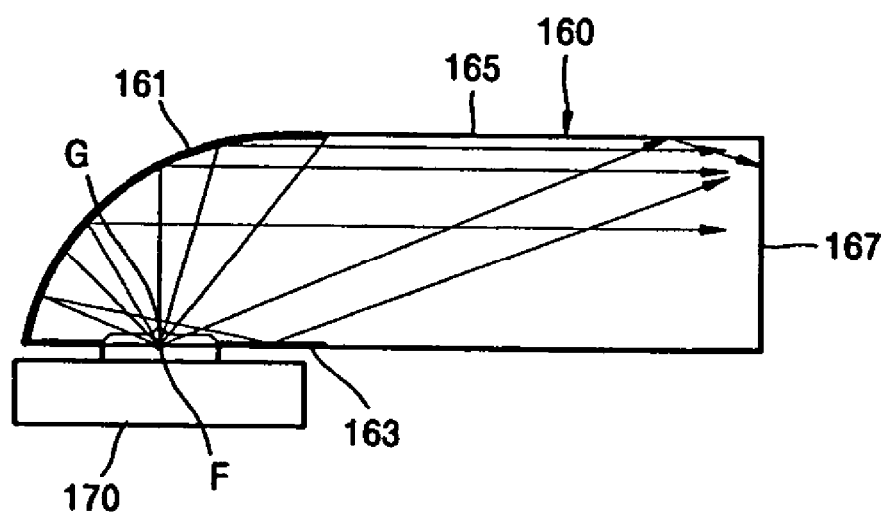
FIG. 10 is a side view illustrating the light source unit of the illumination unit of FIG. 2.

Each of the first, second, third, and fourth light sources 110, 120, 130, and 140 include one or more optical modules 150 as illustrated in FIGS. 9 and 10.

Referring to FIGS. 9 and 10, the optical module 150 includes a collimator 160 having a reflective surface and a light source 170 to emit a light beam of a predetermined wavelength. The collimator 160 can include a first reflective surface 161 with a parabolic shape and a glass rod 165 with a square section. The light source 170 can be a compact light source including at least one light-emitting diode (LED) or a laser diode. A light-emitting part of the light source 170 is disposed at or around a focal point F of the first reflective surface 161. The first reflective surface 161 can be formed by processing a portion of the glass rod 165 in a parabolic shape and reflection-coating a surface of the parabolic portion of the glass rod 165. The collimator 160 may further include a second reflective surface 163 that is formed by reflection-coating regions which face the first reflective surface 161, excluding a region G through which light beams directly emitted from the light source 170 are transmitted.

Accordingly, light beams within a predetermined radiation angle range among the light beams emitted from the light source 170 are reflected by the first reflective surface 161 and then transformed into parallel beams. Since the light-emitting part of the light source 170 is not a point but has a predetermined area, the entire light-emitting part cannot be disposed at the focal point F of the first reflective surface 161. Accordingly, some of the light beams emitted from the light source 170 and reflected by the first reflective surface 161 propagate toward the second reflective surface 163. The second reflective surface 163 reflects the incident light beams toward a light exit surface 167. Since the optical module 150 according to the present embodiment collimates the light beams emitted from the light source 170 using the first reflective surface 161 instead of a lens, it can prevent inefficiency due to constraints, such as etendue, caused when the lens is used.

Although the collimator 160 uses the glass rod 165 in the present embodiment, the present general inventive concept is not limited thereto. A reflective surface with a parabolic shape may be formed on a side of a hollow light tunnel instead of the glass rod 165, and the reflective surface may be formed through internal reflection.

Further, each of the first, second, third, and fourth light source units 110, 120, 130, and 140 of the illumination unit may have an array of optical modules 150, as illustrated in FIG. 2. In this case, the arrays of optical modules 150 of the first, second, third, and fourth light source units 110, 120, 130, and 140 emit light beams of blue, red, green, and cyan wavelengths, respectively. Accordingly, if the first, second, third, and fourth light source units 110, 120, 130, and 140 are simultaneously or sequentially driven, the light beams of the blue, red, green, and cyan wavelengths can be emitted and all colors of light made by combinations thereof can also be emitted. Accordingly, if the illumination unit is applied to a projection type image display apparatus, the projection type image display apparatus can emit color light without using a color wheel.

As described above, since the illumination unit of the embodiment of FIG. 2 includes the hexahedral color synthesis prism 200 and the first, second, and third dichroic mirrors 271, 273, and 275 inside the color synthesis prism 200, the illumination unit can employ the first, second, third, and fourth light source units 110, 120, 130, and 140 to emit the first, second, third, and fourth light beams $L_1$, $L_2$, $L_3$, and $L_4$ of different wavelength bands, thereby increasing a color gamut.

Although the first, second, third, and fourth beams $L_1$, $L_2$, $L_3$, and $L_4$ are illustrated in the embodiment of FIG. 2 as having the blue, red, green, and cyan wavelengths, respectively, the present general inventive concept is not limited thereto. That is, various modifications can be made by changing the arrangements of the first, second, and third dichroic mirrors 271, 273, and 275.

Figure 11:
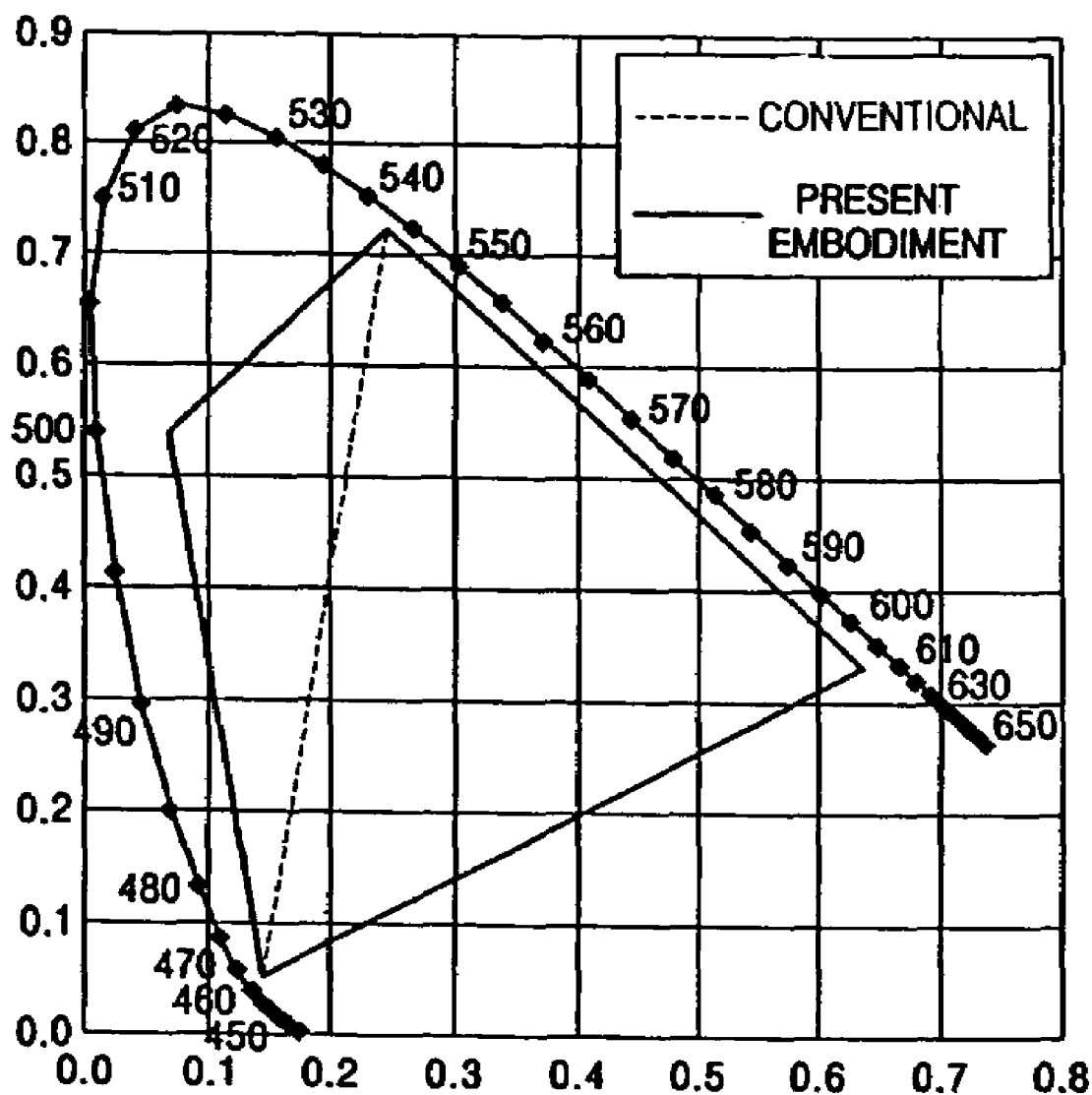
FIG. 11 is a graph illustrating a color gamut of light synthesized by the illumination unit of FIG. 2.

FIG. 11 is a graph illustrating a color gamut of light synthesized by the illumination unit of FIG. 2. Referring to FIG. 11, a conventional illumination unit emits three beams of red, blue, and green wavelengths, and the illumination unit of FIG. 2 emits four beams of red, blue, green, and cyan wavelengths. When being compared, the illumination unit of FIG. 2 has a wider color gamut than that of the conventional illumination unit.

Figure 12:
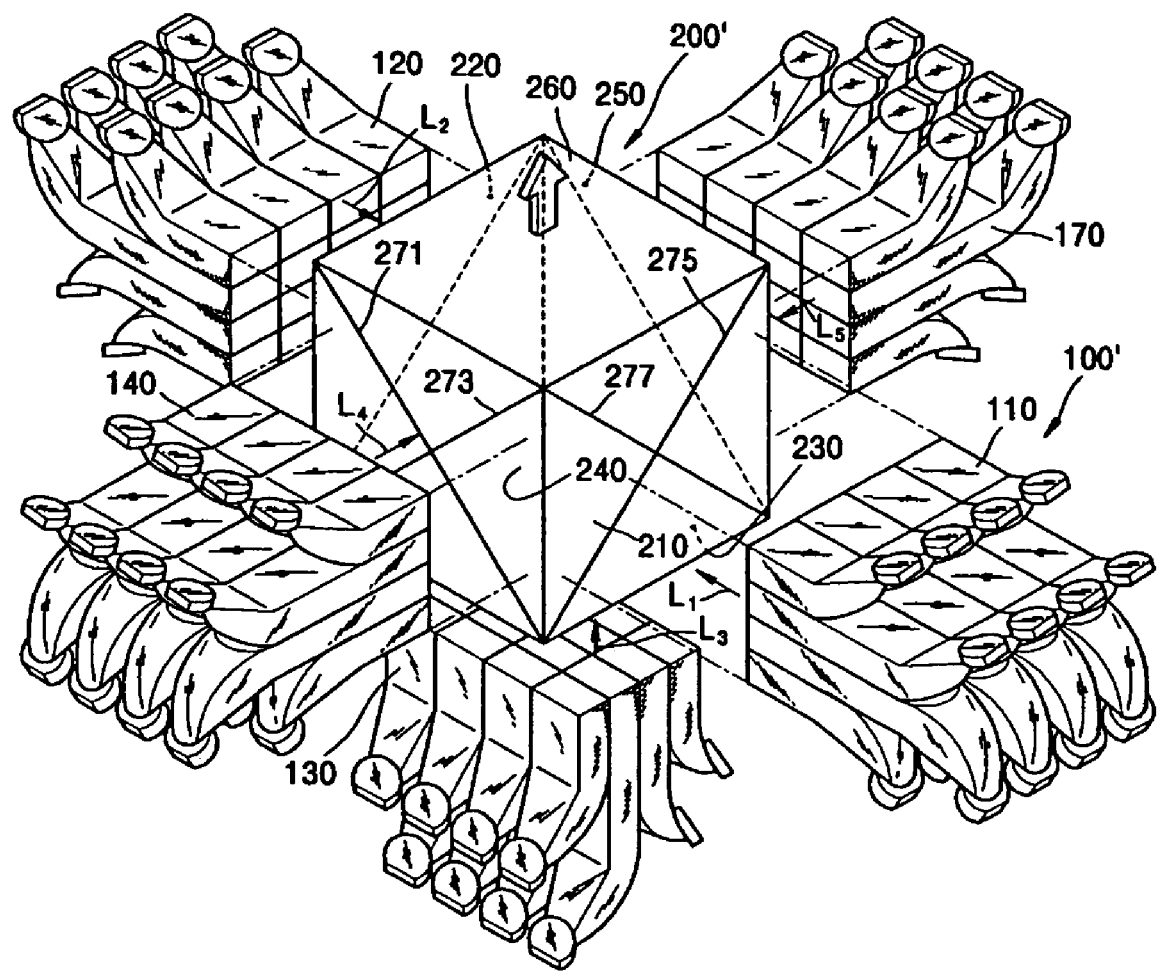
FIG. 12 is a schematic perspective view illustrating an optical arrangement of an illumination unit according to another embodiment of the present general inventive concept.

FIG. 12 illustrates an illumination unit according to another embodiment of the present general inventive concept. Referring to FIG. 12, the illumination unit includes a light source unit 100' including a plurality of light source units 110, 120, 130, 140, and 170 to emit light beams of different wavelength bands, and a color synthesis prism 200' to synthesize the light beams emitted from the light source unit 100' to propagate the light beams along the same path with respect to each other.

The illumination unit of the embodiment of FIG. 12 is similar to the illumination unit of the embodiment of FIG. 2 except that the light source unit 100' of the illumination unit of FIG. 12 further includes a fifth light source unit 170 to emit a fifth light beam $L_5$, and the color synthesis prism 200' of the illumination unit of FIG. 12 further includes a fifth entrance surface 250 through which the fifth light beam $L_5$ is incident and a fourth dichroic mirror 277. Accordingly, the illumination unit of FIG. 12 provides a wider color gamut than the illumination unit of FIG. 2.

The fifth light beam $L_5$ emitted from the fifth light source unit 170 is a light beam of a wavelength different from those of the first, second, third, and fourth beams $L_1$, $L_2$, $L_3$, and $L_4$. For example, the fifth light beam $L_5$ may be a magenta beam. The fifth entrance surface 250 through which the fifth light beam $L_5$ is incident is adjacent to the first, second, and third entrance surfaces 210, 220, and 230 and the exit surface 260, and faces the fourth entrance surface 240. The fourth dichroic mirror 277 is color-coated to reflect the fifth light beam $L_5$ incident through the fifth entrance surface 250 toward the exit surface 260 and transmit the first, second, third, and fourth light beams $L_1$, $L_2$, $L_3$, and $L_4$ therethrough. Accordingly, the first, second, third, fourth, and fifth light beams $L_1$, $L_2$, $L_3$, $L_4$ and $L_5$ of the different wavelengths are synthesized and emitted along the same path with respect to each other, thereby increasing a color gamut.

Although the first, second, third, fourth, and fifth beams $L_1$, $L_2$, $L_3$, $L_4$ and $L_5$ are illustrated in the embodiment of FIG. 12 as having the blue, red, green, cyan, and magenta wavelengths, respectively, the present general inventive concept is not limited thereto. That is, various modifications can be made by changing the arrangements of the first, second, third, and fourth dichroic mirrors 271, 273, 275, and 277.

Figure 13:
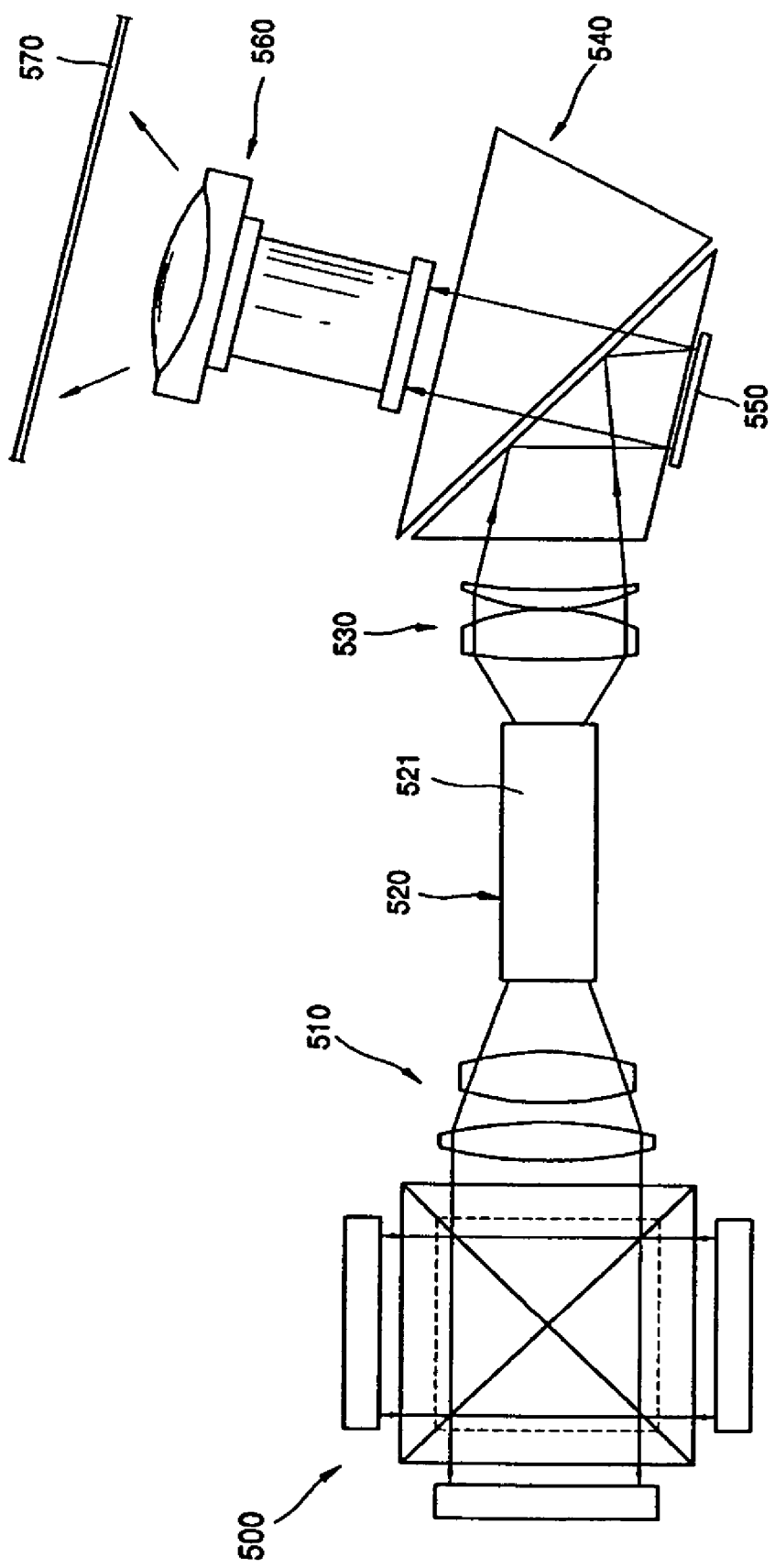
FIG. 13 is a schematic view illustrating an optical arrangement of a projection type image display apparatus according to an embodiment of the present general inventive concept.

FIG. 13 illustrates a projection type image display apparatus according to an embodiment of the present general inventive concept. Referring to FIG. 13, the projection type image display apparatus according to this embodiment includes an illumination unit 500, an image-forming device 550 to create an image corresponding to an input signal input from light emitted from the illumination unit 500, and a projection lens unit 560 to enlarge and project the image created by the image-forming device 550 onto a screen 570.

The illumination unit 500 includes a plurality of light source units disposed at different positions and a synthesis prism to synthesize a plurality of beams emitted from the light source units. Since the illumination unit 500 can be substantially identical in construction with the one of the illumination units illustrated in FIGS. 2 and 12, a detailed explanation thereof will not be given. The plurality of light source units of the illumination unit 500 are sequentially turned on or off to sequentially emit four beams of red, blue, green, and cyan wavelengths or five beams of red, blue, green, cyan, and magenta wavelengths. Accordingly, in the projection type image display apparatus using a single-panel image-forming device, the illumination unit 500 can be used instead of a color wheel (not shown) to obtain a color image.

The image-forming device 550 selectively reflects an incident uniform beam for each pixel to create an image. The image-forming device 550 may be a reflective-type liquid crystal display (LCD) device, a transmission-type LCD device, or a digital micromirror device (DMD). Here, the reflective-type LCD device or the transmission-type LCD device forms an image using the polarization characteristics the incident uniform beam, whereas the DMD does not use the polarization characteristics. Hence, if the DMD is used as the image-forming device 550, a separate polarization converting unit or a polarizer is not required.

When the DMD is employed as the image-forming device 550 in FIG. 13, the DMD includes a two-dimensional array of independently driven micromirrors, and produces an image by independently setting an angle of reflection for each pixel according to the input signal. A beam splitter 540 can be disposed between the illumination unit 500 and the image-forming device 550 to change a propagation path of incident light. The beam splitter 540 changes the path of incident light such that a light beam incident thereon from the illumination unit 500 is directed toward the image-forming device 550 and a light beam incident from the image-forming device 550 is directed toward the screen 570. The beam splitter 540 can be a critical angle prism which can change the path of a light beam using critical angle total reflection characteristics.

The projection lens unit 560 faces the beam splitter 540, and enlarges the image that is formed by the image-forming device 550 and incident through the beam splitter 540 and projects the enlarged image onto the screen 570.

Furthermore, the projection type image display apparatus illustrated in FIG. 13 can further include a light integrator 520 disposed between the illumination unit 500 and the beam splitter 540 to make the light beams incident thereon from the illumination unit 500 uniform. The light integrator 520 may be a rectangular parallelepiped glass rod 521 that totally reflects the incident light beams. In this case, a condensing lens unit 510 can be disposed between the illumination unit 500 and the glass rod 521 to focus the light beams emitted from the illumination unit 500 to the glass rod 521. The condensing lens unit 510 can be formed of one or more lenses, and focuses incident parallel light beams and makes the focused light beams incident on the glass rod 521.

The projection type image display apparatus illustrated in FIG. 13 can further include a relay lens unit 530 disposed between the glass rod 521 and the beam splitter 540. The relay lens unit 530 can be formed of one or more lenses that relay the uniform light emitted from the glass rod 521 to the DMD on which the image is formed.

Figure 14:
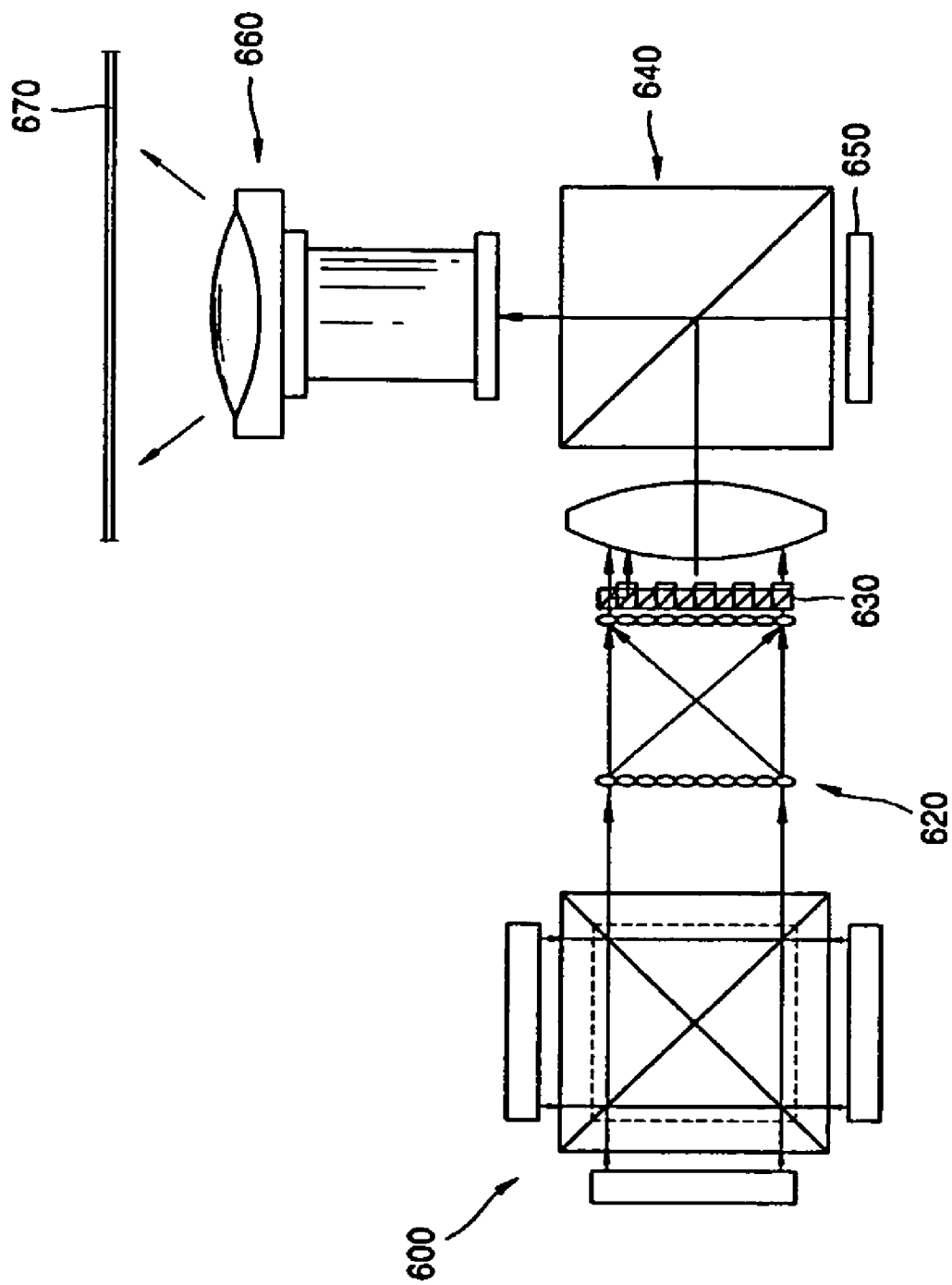
FIG. 14 is a schematic view illustrating an optical arrangement of a projection type image display apparatus according to another embodiment of the present general inventive concept.

FIG. 14 illustrates a projection type image display apparatus according to another embodiment of the present general inventive concept. Referring to FIG. 14, the projection type image display apparatus includes an illumination unit 600, an image-forming device 650 to create an image corresponding to an input image signal from light incident from the illumination unit 600, and a projection lens unit 660 to enlarge and project the image created by the image-forming device 650 onto a screen 670.

Since the illumination unit 600 of FIG. 14 can be substantially identical in construction with one of the illumination units illustrated in FIGS. 2 and 12, a detailed explanation thereof will not be given.

The image-forming device 650 selectively reflects an incident uniform light beam for each pixel to create an image. A reflective-type LCD device that forms an image using the polarization characteristics of the incident uniform light beam is employed as the image-forming device 650 in the embodiment of FIG. 14.

A polarization beam splitter 640 can be disposed between the illumination unit 600 and the image-forming device 650 to change the propagation path of incident light. The polarization beam splitter 640 changes the path of incident light such that a light beam incident from the illumination unit 600 is directed toward the image-forming device 650 and a light beam incident from the image-forming device 650 is directed toward the screen 670. A polarization converting unit 630 can be disposed between the illumination unit 600 and the polarization beam splitter 640 to change a polarization direction of incident light and direct light with a specific polarization toward the polarization beam splitter 640. The polarization converting unit 630 includes a plurality of small polarization beam splitters and a quarter-wave plate, and changes most incident non-polarized light to light with a specific polarization. The construction of the polarization converting unit 630 is well known and thus a detailed explanation thereof will not be given.

The projection type image display apparatus illustrated in FIG. 14 can further include a light integrator 620 to integrate light incident from the illumination unit 600 to provide uniform light. The light integrator 620 may include a fly-eye lens array including one or more lenses each of which has a plurality of fly-eye shaped or cylindrical lens cells that are adjacent to one another.

Figure 15:
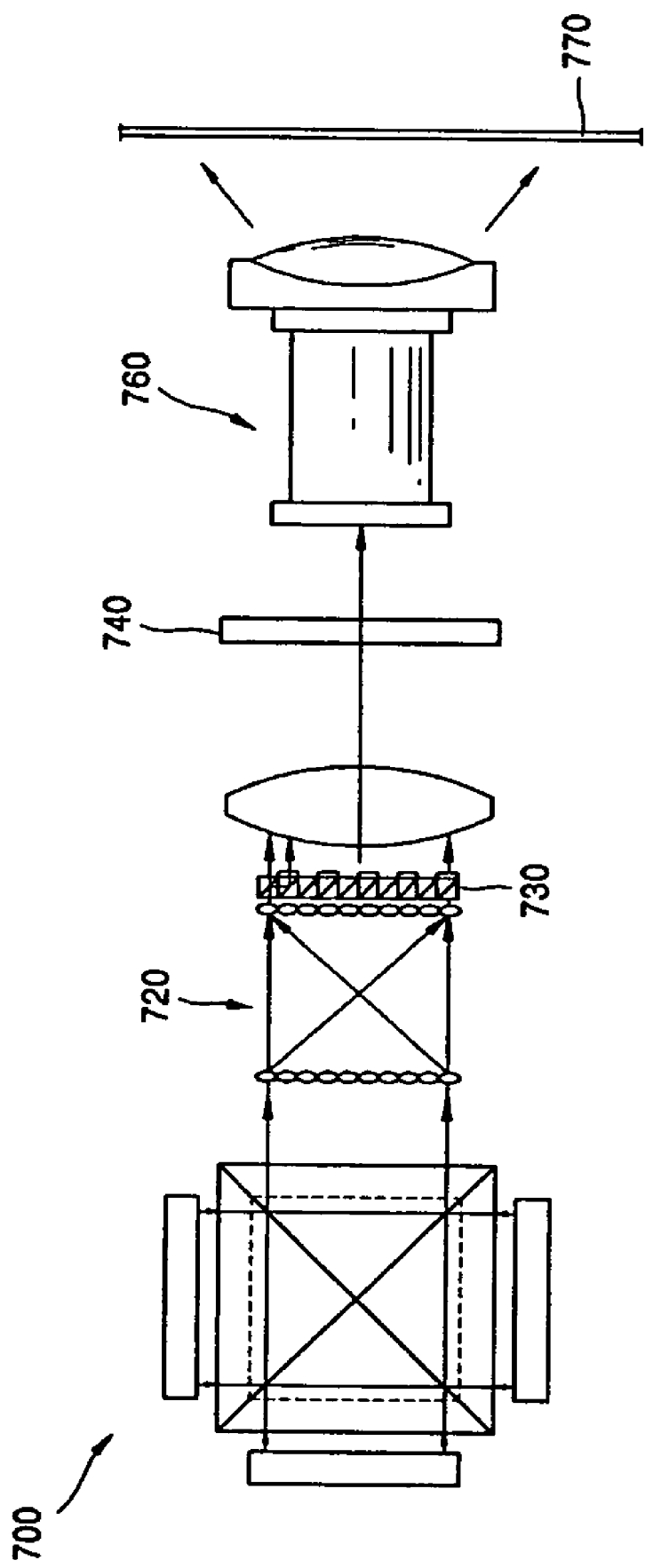
FIG. 15 is a schematic view illustrating an optical arrangement of a projection type image display apparatus according to still another embodiment of the present general inventive concept.

FIG. 15 illustrates a projection type image display apparatus according to still another embodiment of the present general inventive concept. Referring to FIG. 15, the projection type image display apparatus includes an illumination unit 700, an image-forming device 740 to create an image corresponding to an input image signal from light incident from the illumination unit 700, and a projection lens unit 760 to enlarge and project the image created by the image-forming device 740 onto a screen 770.

Since the illumination unit 700 can be substantially identical in construction with one of the illumination units illustrated in FIGS. 2 and 12, a detailed explanation thereof will not be given.

The image-forming device 740 selectively reflects an incident uniform light beam for each pixel to create an image. A transmission-type LCD device that forms an image using the polarization characteristics of incident light is employed as the image-forming device 740 in the embodiment of FIG. 15. In this embodiment, a beam splitter is not required, in contrast with the projection type image display apparatuses illustrated in FIGS. 13 and 14.

Since the transmission-type LCD device forms an image using polarization characteristics, a polarization converting unit 730 can be disposed between the illumination unit 700 and the image-forming device 740. The projection type image display apparatus illustrated in FIG. 15 can further include a light integrator 720 that makes light incident from the illumination unit uniform. The light integrator 720 may include a fly-eye lens array including one or more lenses each of which has fly-eye shaped or cylindrical lens cells that are adjacent to one another.

As described above, since an illumination unit according to the embodiments of the present general inventive concept synthesizes four or five light beams and emits the synthesized light beams along the same path with respect to each other using a hexahedral color synthesis prism, an optical arrangement can be more easily achieved than in a conventional trichroic prism structure, a color gamut can be increased, and various color beams can be emitted.

As described above, since a light source unit according to the embodiments of the present general inventive concept collimates beams using a reflective surface instead of a lens, inefficiency due to constraints, such as etendue, caused when the lens is used can be prevented.

Since a projection type image display apparatus according to the embodiments of the present general inventive concept employs an illumination unit as described above, the projection type image display apparatus can be made compact. Moreover, since the projection type image display apparatus emits color beams using first through fourth or fifth light source units that emit beams of different wavelength bands, it can obtain a color image without an additional color wheel.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An illumination unit comprising:
   first, second, third, and fourth light source units to emit first, second, third, and fourth light beams of different wavelength bands; and a hexahedral color synthesis prism to synthesize the first, second, third, and fourth light beams emitted from the first, second, third, and fourth light source units to propagate the first, second, third, and fourth light beams along the same path, wherein the color synthesis prism comprises:

first and second entrance surfaces opposing each other and allowing the first and second beams to be respectively incident therethrough;

a third entrance surface disposed adjacent to the first and second entrance surfaces and allowing the third beam to be incident therethrough;

a fourth entrance surface disposed adjacent to the first, second, and third entrance surfaces and allowing the fourth beam to be incident therethrough;

an exit surface disposed adjacent to the first, second, and fourth entrance surfaces to oppose the third entrance surface and allowing the first through fourth beams to be emitted therethrough;

a first dichroic mirror to reflect the first light beam incident through the first entrance surface toward the exit surface and to transmit the second, third, and fourth beams therethrough;

a second dichroic mirror to reflect the second light beam incident through the second entrance surface toward the exit surface and to transmit the first, third, and fourth light beams therethrough; and a third dichroic mirror to reflect the fourth light beam incident through the fourth entrance surface toward the exit surface and to transmit the first, second, and third light beams therethrough.

2. The illumination unit of claim 1, wherein the first, second, and third dichroic mirrors respectively comprise first, second, and third surfaces formed on first, second, and third diagonal sections of the hexahedral color synthesis prism extending in an inclined manner with respect to the exit surface to reflect the first, second, and fourth light beams, respectively.

3. The illumination unit of claim 1, wherein each of the first, second, third, and fourth light source units comprises one or more optical modules to emit parallel light beams, each of the optical modules including a collimator having a reflective surface and a light source disposed within the reflective surface to emit light of a predetermined wavelength.

4. The illumination unit of claim 3, wherein the light source comprises one of one or more light-emitting diodes and one or more laser diodes.

5. The illumination unit of claim 1, wherein the first light beam is a blue beam, and the first dichroic mirror is color-coated to reflect the blue beam.

6. The illumination unit of claim 1, wherein the second light beam is a red beam, and the second dichroic mirror is color-coated to reflect the red beam.

7. The illumination unit of claim 1, wherein the fourth light beam is a cyan beam, and the third dichroic mirror is color-coated to reflect the cyan beam.

8. The illumination unit of claim 1, further comprising a fifth light source unit to emit a fifth light beam of a wavelength different from the first, second, third, and fourth beams, wherein the color synthesis prism further comprises a fifth entrance surface disposed adjacent to the first, second, and third entrance surfaces and the exit surface to oppose the fourth entrance surface and allowing the fifth light beam to be incident therethrough, and a fourth dichroic mirror to reflect the fifth light beam incident through the fifth entrance surface toward the exit surface and to transmit the first, second, third, and fourth light beams, and the first, second, and third dichroic mirrors transmit the light fifth beam.

9. The illumination unit of claim 8, wherein the fifth light beam is a magenta beam, and the fourth dichroic mirror is color-coated to reflect the magenta beam.

10. An illumination unit, comprising:

a hexahedral prism;

first, second, third, and fourth light emitting units each disposed at a different outer surface of the hexahedral prism to emit light having first, second, third, and fourth predetermined wavelengths into the hexahedral prism; and a plurality of dichroic mirrors disposed within the hexahedral prism to reflect and transmit the light emitted by the first, second, third, and fourth light emitting units according to the first, second, third, and fourth predetermined wavelengths to output the light emitted by the first, second, third, and fourth light emitting units from the hexahedral prism along a common light path.

11. The illumination unit of claim 10, wherein the plurality of dichroic mirrors are disposed along diagonals of the hexahedral prism.

12. The illumination unit of claim 10, wherein the plurality of dichroic mirrors comprise:

a first dichroic mirror to reflect the light having the first predetermined wavelength toward to the common light path and to transmit the light having the second, third, and fourth predetermined wavelengths;

a second dichroic mirror to reflect the light having the second predetermined wavelength toward the common light path and to transmit the light having the first, third, and fourth predetermined wavelengths; and a third dichroic mirror to reflect the light having the fourth predetermined wavelength toward the common light path and to transmit the light having the first, second, and third predetermined wavelengths.

13. The illumination unit of claim 12, wherein the third light emitting unit emits the light having the third predetermined wavelength into the hexahedral prism in a direction of the common light path.

14. The illumination unit of claim 10, further comprising:

a fifth light emitting unit disposed at a different outer face of the hexahedral prism to emit light having a fifth predetermined wavelength into the hexahedral prism, wherein the plurality of dichroic mirrors reflect and transmit the light emitted by the fifth light emitting unit according to the fifth predetermined wavelength to output the light along the common light path.

15. A projection type image display apparatus comprising:

an illumination unit comprising:

first, second, third, and fourth light source units to emit first, second, third, and fourth light beams of different wavelength bands, and a hexahedral color synthesis prism to synthesize the first, second, third, and fourth light beams emitted from the first, second, third, and fourth light source units to propagate the first, second, third, and fourth light beams along the same path, the color synthesis prism including:

first and second entrance surfaces opposing each other and allowing the first and second beams to be respectively incident therethrough, a third entrance surface disposed adjacent to the first and second entrance surfaces and allowing the third beam to be incident therethrough, a fourth entrance surface disposed adjacent to the first, second, and third entrance surfaces and allowing the fourth beam to be incident therethrough, an exit surface disposed adjacent to the first, second, and fourth entrance surfaces to oppose the third entrance surface and allowing the first through fourth beams to be emitted therethrough, a first dichroic mirror to reflect the first light beam incident through the first entrance surface toward the exit surface and to transmit the second, third, and fourth beams therethrough, a second dichroic mirror to reflect the second light beam incident through the second entrance surface toward the exit surface and to transmit the first, third, and fourth light beams therethrough, and a third dichroic mirror to reflect the fourth light beam incident through the fourth entrance surface toward the exit surface and to transmit the first, second, and third light beams therethrough;

an image-forming device to create an image corresponding to an input image signal from the first, second, third, and fourth light beams propagated from the illumination unit;

a screen; and a projection lens unit to enlarge and project the image created by the image-forming device onto the screen.

16. The projection type image display apparatus of claim 15, wherein the first, second, and third dichroic mirrors respectively comprise first, second, and third surfaces formed on first, second, and third diagonal sections of the hexahedral color synthesis prism extending in an inclined manner with respect to the exit surface to reflect the first, second, and fourth light beams, respectively.

17. The projection type image display apparatus of claim 15, wherein each of the first, second, third, and fourth light source units comprises one or more optical modules to emit parallel light beams, each of the optical modules including a collimator having a reflective surface and a light source disposed within the reflective surface to emit light of a predetermined wavelength.

18. The projection type image display apparatus of claim 17, wherein the light source comprises one of one or more light-emitting diodes and one or more laser diodes.

19. The projection type image display apparatus of claim 15, wherein the first, second, and fourth light beams respectively comprise blue, red, and cyan beams, and the first through third dichroic mirrors are color-coated to respectively reflect the blue, red, and cyan beams.

20. The projection type image display apparatus of claim 15, further comprising a fifth light source unit to emit a fifth light beam of a wavelength different from the first, second, third, and fourth light beams, wherein the color synthesis prism further comprises a fifth entrance surface disposed adjacent to the first, second, and third entrance surfaces and the exit surface to oppose the fourth entrance surface and allowing the fifth light beam to be incident therethrough, and a fourth dichroic mirror to reflect the fifth beam incident through the fifth entrance surface toward the exit surface and to transmit the first through fourth beams therethrough, and the first, second, and third dichroic mirrors transmit the fifth beam therethrough.

21. The projection type image display apparatus of claim 20, wherein the fifth beam comprises a magenta beam, and the fourth dichroic mirror is color-coated to reflect the magenta beam.

22. The projection type image display apparatus of claim 15, further comprising a light integrator disposed between the illumination unit and the image-forming device to make the first, second, third, and fourth light beams propagated from the illumination unit into uniform light.

23. The projection type image display apparatus of claim 22, wherein the light integrator comprises a rectangular parallelepiped glass rod to totally reflect the first, second, third, and fourth light beams.

24. The projection type image display apparatus of claim 22, wherein the light integrator comprise a fly-eye lens array including one or more lenses each of which includes a plurality of fly-eye shaped or cylindrical lens cells arranged adjacent to one another.

25. The projection type image display apparatus of claim 22, wherein the image-forming device comprises a reflective-type image-forming device to selectively reflect the uniform light emitted from the light integrator to create the image, and further comprising:

a beam splitter disposed between the illumination unit and the image-forming device to change the path of the uniform light and the image such that the uniform light incident from the light integrator is directed toward the image-forming device and the image created by the image-forming device is directed toward the screen.

26. The projection type image display apparatus of claim 25, wherein the reflective-type image-forming device comprises a digital micromirror device, and the beam splitter comprises a total internal reflection mirror to totally reflect the uniform light incident from the light integrator toward the digital micromirror device and to transmit the image created by the digital micromirror device.

27. The projection type image display apparatus of claim 25, further comprising:

a polarization converting unit disposed between the illumination unit and the beam splitter to convert a polarization direction of incident light to direct the uniform light having a specific polarization toward the beam splitter, wherein the reflective-type image-forming device comprises a reflective-type liquid crystal display device, and the beam splitter comprises a polarization beam splitter to transmits or reflects the uniform light and the image according to a polarization direction thereof.

28. The projection type image display apparatus of claim 22, further comprising:

a polarization converting unit disposed between the illumination unit and the image-forming device to convert a polarization direction of the uniform light to direct the uniform light having a specific polarization toward the image-forming device, wherein the image-forming device comprises a transmission-type liquid crystal display device to selectively transmit the uniform light emitted from the light integrator to create the image.

* * * * *